United States Patent [19]

Stoll

[11] 4,380,250

[45] Apr. 19, 1983

[54] CHOKE UNIT

[76] Inventor: Kurt Stoll, Lenzhalde 72, 73 Esslingen/N., Fed. Rep. of Germany

[21] Appl. No.: 247,022

[22] Filed: Mar. 24, 1981

[30] Foreign Application Priority Data

Mar. 28, 1980 [DE] Fed. Rep. of Germany ....... 3012059

[51] Int. Cl.³ ............................................. F16K 3/34
[52] U.S. Cl. ................................. 137/599; 137/614.2; 251/208
[58] Field of Search ............................. 137/599, 614.2; 251/208

[56] References Cited

U.S. PATENT DOCUMENTS

| | | | |
|---|---|---|---|
| 2,290,783 | 7/1942 | Turpin | 251/208 X |
| 2,572,950 | 10/1951 | Rider | 251/208 |
| 3,162,736 | 12/1964 | Turner | 251/208 X |
| 4,148,460 | 4/1979 | Kinsler | 251/208 X |
| 4,205,822 | 6/1980 | Bernat | 251/208 |

*Primary Examiner*—Robert G. Nilson
*Attorney, Agent, or Firm*—Flynn, Thiel, Boutell & Tanis

[57] ABSTRACT

In an adjustable choke a restricted choke fluidway takes the form of a groove in the axial face of a plate sealingly resting against a fixed plate, the groove having a cross-section changing along its length. Fluid is let into one end of the groove through the grooved plate and out through a port in the face of the fixed plate. By turning the grooved plate, the length of groove between the two ports is changed so that the choking effect is changed.

12 Claims, 5 Drawing Figures

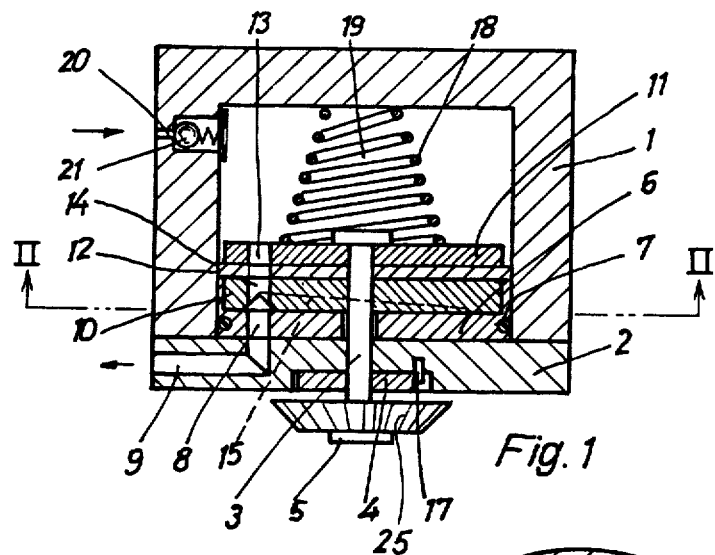
Fig. 1
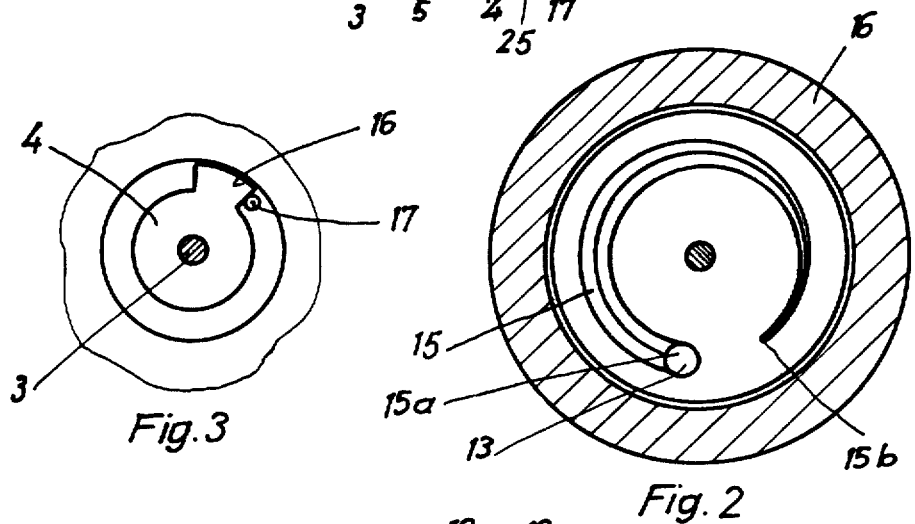
Fig. 3
Fig. 2
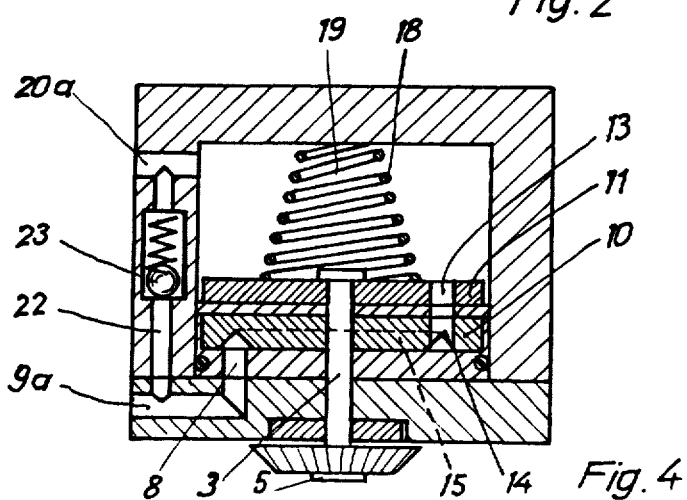
Fig. 4

CHOKE UNIT

FIELD OF THE INVENTION

The invention relates to a choke unit and more specially a pneumatic choke unit with a housing, an inlet duct in the housing, and an adjustment system within the housing for causing a choking effect and having its outlet joined up with an outlet opening.

BACKGROUND OF THE INVENTION

In the prior art "choke screws" have been used for choking a current of gas, for example compressed air. However such screws have a number of different shortcomings, one being for example that they have a very unlinear characteristic, that is to say when the cross-section is small a great change in the choking effect is produced on adjustment while at the other end of the range with a high cross-section only a small change is produced on adjustment. Furthermore, because the chokeway is long and narrow, there is a danger of its becoming stopped up, for example when used for dirty gases. There is the further shortcoming that a choke screw has a high frictional effect.

SUMMARY OF THE INVENTION

For this reason one purpose of the present invention is that of designing a choke which makes possible an exact choking effect while at the same time being simple in design and trouble-free in operation.

For effecting this purpose and other purposes a choke of the sort noted has an adjustment system made up of:

(a) a turning adjustment plate keyed on a shaft able to be turned from without the housing;

(b) a groove on the lower side of the adjustment plate turned towards the output duct, the groove being designed to run round the axis of turning of the plate for less than one full turn, the cross-section of the groove changing along its length, (c) a fixed cover plate resting against the lower side of the adjustment plate;

(d) in the cover plate or in a housing part taking its place and covering the adjustment plate, an outlet hole running from the groove to the outlet duct; and (e) wherein the groove is joined up, in the starting position of the choke at the greatest cross-section and least choking effect, by way of an inlet hole and inlet space with the inlet duct.

In place of a choke screw as in the prior art the invention makes use of a turning adjustment plate, the choking effect being produced by the spiral or helical groove, whose form and whose breadth and/or depth undergo a change along its length or for example on the lines of a logarithmic curve. The choking effect is in this respect caused by the different cross-sections of the groove and the different length of groove through which the air or the like has to make its way. If the adjustment plate is so turned that its largest cross-section is in line with the outlet hole in the cover plate there is generally speaking no choking effect. But if the adjustment plate is so turned that the gas or air is forced to make its way along the ever-narrowing groove towards the outlet duct there is a representative choking effect.

If the duct is designed to extend through less than 360°, the choke may be used for shutting off the gas or air completely. In the invention it is possible for example to have a groove length which is generally equal to about three quarters of a turn of the thumbwheel used for turning the adjustment plate.

Because with the invention, in place of a long narrow duct it is possible to get nearer to a circular cross-section, the danger of the choke being stopped up is very much less and furthermore there is the useful effect, not produced by choke screws, that with the new choke unit of the invention a linear choking function may be produced. There is a regular increase or decrease in the choking effect over the angle of turning of the adjustment plate. In this respect the groove cross-section is in effect always the same in a given position, unlike choke screws. A further useful effect of the choke of the invention is that, because of operation of the adjustment plate by way of a shaft, there is only a small amount of friction. The fact that it is possible to make do with an angle of turning of less than 360° makes it possible to have a low-price scale, the adjustment of the choke with the scale being readily reproducible. The choke unit may be very easily produced.

As part of a useful further development of the invention the groove has a three cornered form as seen in cross-section, the depth of the triangle let into the lower face of the plate and the triangle side at the lower face of the plate decreasing from a highest value, when the inlet hole in the adjustment plate and the inlet opening are in line with the outlet duct, smoothly to the smallest value. The depth of the triangle is in this respect designed so as to be proportional to the angle of turning. Such a design of the groove may be simply produced, for example an equilateral triangle being able to be produced by machining the lower side of the adjustment plate with a pointed 60° cutting bit.

A useful effect is produced if on the side of the adjustment plate turned towards the inlet duct there is a facer plate fixedly joined to the adjustment plate and having a hole which is in line with the inlet hole in the adjustment plate.

It is furthermore possible to have, as a further part of the invention, a check valve, opening into the inside of the housing, in the inlet duct.

As part of a further development of the invention, between the inlet duct and the outlet duct there is a bypass duct having within it a check valve opening towards the inlet duct. This measure makes certain that in the case of a sudden pressure drop the facer plate is not able to be lifted clear of the admustment plate.

For a simple design the housing may be made in two pieces, which are air-tightly joined together by way of a gasket in the cover plate. It is possible in this respect as part of the invention for the shaft, the adjustment plate and the facer plate to be bearinged in the front housing part and between the facer plate and the inner opposite face of the housing part, while a spring is placed in the inlet space.

As a further development of the invention the driving thumbwheel with a scale is keyed on the shaft at the front end of the housing. Using this thumbwheel and the scale the desired throttling effect may readily and simply be produced.

As a further part of the invention a stopper plate with a tooth may be keyed on the shaft for use with a stopper pin fixed to the housing so that the positions at the start and the end of the choking range may simply be fixed.

As part of a further development of the invention, between the facer plate and the adjustment plate there is a gasket ring or gasket washer.

BRIEF DESCRIPTION OF THE DRAWINGS

An account will now be given of working examples of the invention to be seen in the diagrammatic figures.

FIG. 1 is a lengthwise section through a choke unit of the present invention.

FIG. 2 is a section on the line II—II taken through the unit of FIG. 1.

FIG. 3 is a view of the unit of the invention as seen looking upwards, the thumbwheel having been taken off.

FIG. 4 is a view of a somewhat changed form of the invention in a view like that of FIG. 1.

DETAILED DESCRIPTION

Figure 1A:
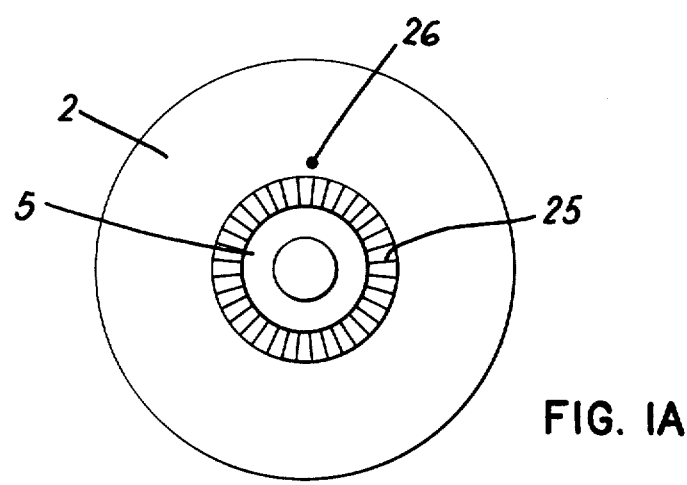
FIG. 1A is a bottom view of the choke unit of FIG. 1.

The choke unit of the invention is made up of two housing parts 1 and 2, housing part 2 being designed as a cover and having a shaft 3 bearinged in it. On the outer side a stopper plate 4 and a thumbwheel 5 are keyed on the shaft 3. On the inner side of cover 2 there is a cover plate 6 which has a gasket 7 for producing a seal between parts 1 and 2 of the housing. Cover plate 6 has a hole 8 lined up with an outlet duct 9 within the housing part 2.

As mentioned hereinabove, a scale can be provided with the thumbwheel 5 in order to indicate the position of the thumbwheel relative to the housing part 2. In the illustrated embodiment, the scale comprises a series of gradations 25 (FIGS. 1 and 1A) provided along the periphery of the thumbwheel 5 and an indicating mark 26 (FIG. 1A) provided on the housing part 2 adjacent the thumbwheel 5.

An adjustment plate 10 and a facing plate 11 are keyed on shaft 3, there being a gasket ring 12 between plates 10 and 11.

The facer plate 11 or disk has a hole 13 which is in line with an inlet hole 14 in the adjustment plate 10 so as to be opening into the space 19 within the housing.

As will be more clearly seen from FIG. 2, hole 13 is joined up by way of inlet hole 14 with a groove 15 in the lower face of adjustment plate 10. Groove 15 is three-cornered in cross-section, its depth and breadth or the length of the triangle side lined adjacent the upper face of the cover plate becoming smaller and smaller in size from the starting at the end having the inlet hole 14. Groove 15 is generally helical in form and so long that, as will be seen from FIG. 2, about three quarters of a turn of thumbwheel 5 are needed for moving the point in the groove aligned with the hole 8 from the position of greatest cross-section at 15a to the least value at 15b. If shaft 3 is turned still further somewhat using thumbwheel 5, the choke unit is completely cut off, that is to say no motion of gas through it is possible.

The end of the turn is fixed by the stopper plate 4 which has a tooth 16, which at the end of the turn comes up against a stop pin 17 fixed in housing part 2.

The parts are resiliently pushed together by spring 18, designed with its one end resting against the inner face of housing part 1 and having the effect of forcing the facer plate 11 together with the adjustment plate 10 towards the cover plate 6, spring 18 stretching through the inlet space 19, into which air makes its way by way of an inlet hole 20 which has a check valve 21.

The working example to be seen in FIG. 4 is of the same structure but for the fact that between the inlet duct 20a and the outlet duct 9a there is a bypass 22 having a check valve 23 which when opened lets air make its way towards the inlet duct 20a. This design has the purpose of stopping the plate 11 from being moved clear of the plate 10 on a sudden pressure drop.

An account will now be given of the operation of the choke units of the invention.

Air comes in by way of inlet duct 20 and makes its way into the space 19 on the inlet side of the adjustment system. Facer plate 11 and adjustment plate 10 are locked together, for example by way of dogs.

By way of hole 13 and inlet hole 14 in the adjustment plate air is able to make its way into the groove 15. If now the position of the shaft is such that the inlet hole 13 is truly in line with the outlet hole 8 in the cover plate 6, it is possible for the air to make its way generally freely and without any choking effect to the outlet duct 9 and out of the housing. For producing a choking effect the shaft 3 is turned the desired amount, such a position of turning being made clear for example in FIG. 4. In this case the air makes its way on the same lines by way of hole 13 and inlet hole 14 into groove 15. Because the inlet hole 14 has now been moved in relation to outlet hole 8 it is firstly necessary for the air to make its way through groove 15 towards the outlet hole 8. The cross-section of the groove 15 becomes narrower in this direction, and the desired choking effect of the air current is thus produced. The angle of turning of the thumbwheel 3 is in line with the depth and breadth of the groove so that the degree of choking may be fixed as desired to get the desired linear or other choking function dependent on the degree of turning.

In place of the cover plate 6 it would furthermore be possible to have a part of the housing producing this function, that is to say covering over the adjustment plate.

Furthermore the new choke unit of the invention may be used for the control of the flow of a gas current, that is to say not only for controlling the flow of air.

The embodiments of the invention in which an exclusive property or privilege is claimed are defined as follows:

1. In a choke apparatus for gases having a housing, an inlet duct in said housing and an adjustment system for changing the choking effect, said system communicating with an outlet opening, the improvement comprising wherein said adjustment system includes:
   (a) a rotatable adjustment plate, a shaft able to be turned from without said housing and having said plate keyed thereon,
   (b) means defining an outlet duct in communication with said outlet opening, one side of said adjustment plate facing said outlet duct and having formed therein a groove extending less than 360° around the axis of rotation of said plate, said groove having a cross-section which changes in area along its length, and
   (c) a fixed cover plate covering said side of said adjustment plate with said groove, said cover plate having an outlet hole which is aligned with said groove and communicates with said outlet duct, said plate with said groove being able to be rotated from a starting position with the lowest choking effect to a position with the largest choking effect, the end of said groove with the largest cross-section communicating with an inlet opening in said adjustment plate which by way of an inlet space in said housing communicates with said inlet duct.

2. The choke apparatus as claimed in claim 1, wherein said groove has in cross-section the shape of a triangle, the depth of said groove into said adjustment plate and the breadth of said groove as measured at said one side of said plate each decreasing continuously from a highest value in the region of said inlet opening in said adjustment plate to a lowest value at a location remote from said inlet opening.

3. The choke apparatus as claimed in claim 2, wherein the depth of said groove at a location therein aligned with said outlet hole is proportional to the angular position of said adjustment plate.

4. The choke apparatus as claimed in claim 2, wherein on the side of said adjustment plate opposite said one side there is a facer plate fixedly joined to said adjustment plate and having an inlet hole therethrough which communicates with said inlet opening in said adjustment plate.

5. The choke apparatus as claimed in claim 1, including a check valve provided in said inlet duct, said check valve inhibiting gas flow from the inside of said housing into said inlet duct.

6. The choke apparatus as claimed in claim 1, wherein between said inlet duct and said outlet duct there is a bypass with a check valve therein which inhibits gas flow through said bypass from said inlet duct to said outlet duct.

7. The choke apparatus as claimed in claim 1, wherein said housing is made in two pieces and is sealed by a gasket provided on said cover plate.

8. The choke apparatus as claimed in claim 4, wherein said shaft, said adjustment plate and said facer plate are rotatably supported in a front part of said housing and wherein between and engaging said facer plate and a back wall of said housing is a spring which extends through said inlet space and urges said facer plate and said adjustment plate toward said cover plate.

9. The choke apparatus as claimed in claim 1, including a thumbwheel provided on said shaft at a front side of said housing and a scale which indicates the position of said thumbwheel relative to said housing.

10. The choke apparatus as claimed in claim 1, wherein a stopper member is fixed on said shaft and is cooperable with a stop pin fixed to said housing to limit relative rotation of said shaft and housing.

11. The choke apparatus as claimed in claim 4, wherein between said facer plate and said adjustment plate there is a sealing gasket.

12. A choke apparatus as claimed in claim 1, wherein said groove is spiral in form.

* * * * *